United States Patent
Zhu

(10) Patent No.: US 8,702,362 B2
(45) Date of Patent: Apr. 22, 2014

(54) UNCONVENTIONAL BOLT AND A FASTENING DEVICE USING THE UNCONVENTIONAL BOLT THEREOF

(75) Inventor: Jianhua Zhu, Ningbo (CN)

(73) Assignee: Ningbo Bangda Intelligent Parking System Co., Ltd., Ningbo (CN)

( * ) Notice: Subject to any disclaimer, the term of this patent is extended or adjusted under 35 U.S.C. 154(b) by 0 days.

(21) Appl. No.: 13/808,953

(22) PCT Filed: Aug. 30, 2010

(86) PCT No.: PCT/CN2010/001312
§ 371 (c)(1),
(2), (4) Date: Jan. 8, 2013

(87) PCT Pub. No.: WO2012/006765
PCT Pub. Date: Jan. 19, 2012

(65) Prior Publication Data
US 2013/0108394 A1 May 2, 2013

(30) Foreign Application Priority Data

Jul. 12, 2010 (CN) .......................... 2010 1 0228196

(51) Int. Cl.
*F16B 39/00* (2006.01)

(52) U.S. Cl.
USPC ........ 411/166; 411/173; 411/366.1; 411/383; 411/388; 411/389

(58) Field of Classification Search
USPC .............. 411/166, 172, 173, 351, 366.1, 367, 411/371.2, 383, 388, 389, 396, 397, 402, 411/424; 52/118, 632, 849
See application file for complete search history.

(56) References Cited

U.S. PATENT DOCUMENTS

| | | | | | |
|---|---|---|---|---|---|
| 83,225 | A | * | 10/1868 | Tudor | 411/166 |
| 908,530 | A | * | 1/1909 | Wolhaupter | 238/160 |
| 1,078,007 | A | * | 11/1913 | Stange | 52/704 |
| 1,117,654 | A | * | 11/1914 | Foster | 52/374 |
| 1,267,030 | A | * | 5/1918 | Williams | 411/367 |
| 1,438,601 | A | * | 12/1922 | Kempton | 403/44 |
| 2,395,377 | A | * | 2/1946 | MacLean, Jr. | 411/166 |
| 2,409,662 | A | * | 10/1946 | Christensen | 280/482 |
| 3,032,281 | A | * | 5/1962 | Wexell | 241/92 |
| 3,541,917 | A | * | 11/1970 | Vandouwen et al. | 411/368 |
| 3,847,374 | A | * | 11/1974 | Tittelbach | 251/367 |
| 4,373,309 | A | * | 2/1983 | Lutz | 52/182 |
| 5,647,710 | A | * | 7/1997 | Cushman | 411/397 |
| 6,250,608 | B1 | * | 6/2001 | Ridley | 254/415 |
| 7,121,780 | B2 | * | 10/2006 | Matich et al. | 411/367 |

OTHER PUBLICATIONS

Office Action of corresponding JP application, issued on Dec. 3, 2013.

* cited by examiner

*Primary Examiner* — Roberta Delisle
(74) *Attorney, Agent, or Firm* — Wang Law Firm, Inc.; Li K. Wang; Stephen Hsu

(57) ABSTRACT

An unconventional bolt includes a main body having two heads, and two threaded rods respectively formed at the external surface of each head coaxially with the main body, wherein the cross section of each head has a noncircular shape, and the axial projection of the cross section of the middle of the main body is located in the noncircular axial projection of each head of the main body. The unconventional bolt has a simple structure and a convenient assembly, and can improve the strength and rigidity of the nested profiled components after the connection; and the fastening device using the unconventional bolt can not only support the component but also reinforce it, thus effectively preventing the nested profiled components from transforming.

5 Claims, 4 Drawing Sheets

B-B

A-A

UNCONVENTIONAL BOLT AND A FASTENING DEVICE USING THE UNCONVENTIONAL BOLT THEREOF

RELATE APPLICATIONS

This application is a national phase entrance of and claims benefit to PCT Application for An Unconventional Bolt and A Fastening Device Using the Unconventional Bolt Thereof and the Application thereof, PCT/CN2010/001312, filed on Aug. 30, 2010, which claims benefit to Chinese Patent Application 201020260463.9, filed on Jul. 12, 2010. The specifications of both applications are incorporated herein by reference.

FIELD OF THE INVENTION

The present invention relates to an unconventional bolt and a fastening device using such unconventional bolt to connect two nested profiled components.

DESCRIPTION OF THE PRIOR ART

In the prior art, profile is mostly applied in such beams and columns components as the load bearing beams and connecting columns for the frame, storage shelf, frame structure etc. of a three-dimensional parking garage. When used in the products, the standard profiles available in the market, however, are not so beautiful owning to the simple shapes of their cross sections, unitary structure and poor-quality appearance; moreover, the length of the standard profiles is usually far longer than that of the beams or columns in actual use, and the redundant sections need to be tailored. For this reason, in the whole course of processing, lots of the remnants thereof will be cut off, thus causing a serious waste of raw materials and leading to a low material-utilization ratio.

To save the raw materials and reduce the production cost, the nested profiles are currently used to replace the standard profiles for use as the beams and columns for the storage shelf and frame of the three-dimensional parking garage. A comparatively thin rolling plate is often adopted by the common nested profiles as the raw material, and then forms, through a cold rolling, a nested first component and a nested second component, which have the same cross section. After the rotation by 180 degrees of the second component, the first component and the second component embrace each other to form a column body, thus enabling a transverse edge (or vertical edge) of the first component to fit closely with that of the second component.

After the first component and the second component fit closely with each other, the transverse edges are in a twin-layers structure. To prevent the first component and the second component from becoming disconnected from each other and guarantee the strength of the embracing beam, in a traditional practice, the twin-layers transverse edges (or the twin-layers vertical edges) after fitting closely with each other are fixed using the electric welding technology. However, on one hand, the appearance is influenced due to the fact that the application of welding technology is apt to cause welding scar; on the other hand, the welding head can not probe into the middle part of the beams and columns that are in a strip structure and ends up with welding the twin-layers structure at the middle position; furthermore, the welding technology only serve to reinforce the twin-layers structure, and can not be used to support the inner cavity of the nested profile, which may cause a structural deformation on the profile owning to a hollow inner cavity; in addition, the cavity, where a sleeve structure is inserted into the nested profile, is also applied. Each end of the sleeve abuts on the corresponding inner wall of the twin-layers structure, respectively, thereby delivering a dual function both for supporting and reinforcing. But the same problem exists in the reinforcing and welding of the sleeve, that is, the sleeve can be only set at the two ends of the nested profiled components that are close to the opening. As to the long-strip beams and columns with the nested composite structure, the twin-layers structure at the middle position fails to make reinforcement due to the difficulty of the sleeve in probing into the cavity of the beams and columns, thus influencing the strength of the nested profiles.

SUMMARY OF THE INVENTION

It is a first object of the present invention to provide an unconventional bolt, which not only is convenient and easy to assemble and install, but also can effectively improve the rigidity and strength of the profiled components.

For achieving the above stated first object, the unconventional bolt comprises a main body with a first cross section and two ends, wherein each end comprises a head coaxially connected to the main body, and a threaded rod coaxially connected to the head, the head has a noncircular cross section, and the first cross section of the main body is contained within the noncircular cross section of the head.

In the above stated solution, the cross section of the head can be in any noncircular cross section, such as waist-round, rectangle, oval, square, triangle, diamond, trapezoid, and polygon with four or more edges. However, in consideration of the overall strength and processing convenience of the unconventional bolt, it is preferable that the first cross section of the main body is substantially identical to the noncircular cross section of the head. In such a way, the main body of the unconventional bolt has a uniform cross section, that is, the first cross section of the main body can be a shape selected from the following group: waist-round, rectangle, oval, square, triangle, diamond, trapezoid, and polygon with four or more edges. Among the stated noncircular shapes, the waist-round or rectangle is preferred, each of which can ensure a comparatively large touching area after the installation of the unconventional bolt.

As a preference, the first cross section of the main body has a center line defined by a longest diameter line of the first cross section that is perpendicular to a shortest diameter line of the first cross section, and each end has a marking slot, the marking slot has an opening aligned with the center line.

It is a second object of the present invention to provide a fastening device using the unconventional bolt thereof, which not only is convenient and easy to assemble and install, but also can effectively improve the rigidity and strength of the profiled components.

For achieving the above stated second object, the fastening device using the unconventional bolt, the fastening device connecting two nested profiled components that include a first component and a second component, the first component and the second component having same shape and size and forming a hollowed column body, the first component comprises a first edge and a second edge substantially parallel to each other, the second component comprises a third edge and a forth edge substantially parallel to each other; the first edge connecting to the third edge forming a first twin-layers side wall, and the second edge connecting the forth edge forming a second twin-layers side wall; wherein the fastening device comprises the unconventional bolt and two nuts which are connected at two ends of the unconventional bolt; the first twin-layers side wall is provided with a first through hole, and the second twin-layers side wall is provided with a second through hole aligned with the first through hole, the first through hole and the second through hole having a shape and a size adapted to receive the noncircular cross section of the heads of the unconventional bolt; each head of the unconventional bolt rests against an inner surface of a twin-layers side wall after being inserted through the through holes and rotated to be misaligned with the through holes; two nuts are respectively screwed on two threaded rods of the unconventional bolt that extend to outside of the twin-layers side walls of the column body.

In order to enlarge the touching area between the surface of the nut and the external wall of the two nested profiled components, for guaranteeing the pressing force and improving the connecting strength, preferably, the nut can be either a hex nut or a square nut. And a circular flake is provided between a nut and the corresponding twin-layers side wall to increase contact area between the nut and the twin-layers side wall, the circular flake and the nut are formed into one single body.

In order to avoid the rotation caused when the unconventional bolt are inserted into the first through hole and the second through hole, preferably, the fastening device further comprises two stop sleeves, each of stop sleeves includes a ring head adapted to receive the threaded rod and a plug pin extending vertically away from the ring head; each plug pin is inserted into a gap between the head and the through hole, and each threaded rod runs through a ring head, each nut rests against a stop sleeve after being screwed onto the threaded rod. As the gap between the surface of the main body and the through hole will be formed after the main body of the unconventional bolt rotates to be misaligned with the through holes, the plug pin of the stop sleeve can rightly be inserted into the gap to be adapted to the gap, so as to ensure the unconventional bolt to be unable to rotate. The stop sleeve can be pressed by the nut tightly to achieve a reliable connection.

In order to enhance the connection reliability and prevent the looseness between the nut and the stop sleeve happening, preferably, an anti-slip gasket is provided between each nut and each stop sleeve.

The cross section of the head can be in any noncircular cross section, such as the waist-round, rectangle, oval, square, triangle, diamond, trapezoid and polygon with four or more edges. However, in consideration of the overall strength and processing convenience of the unconventional bolt, preferably, the first cross section of the main body is substantially identical to the noncircular cross section of the head. In this way, the main body of the unconventional bolt has a uniform cross section. Among the stated noncircular shapes, the waist-round or rectangle is preferred, each of which can ensure that a comparatively large touching area is formed between the external surface of each head of the unconventional bolt and the inner surface of the corresponding twin-layers side wall, so as to better ensure the overall strength and rigidity of the nested profiled components.

The cross section for each head of the main body or the overall cross section of the main body can be in any noncircular shapes, which can result that each head of the unconventional bolt rests against an inner surface of a twin-layers side wall after being inserted through the through holes and rotated to be misaligned with the through holes. As a preference, the cross sections of each head of the main body or the overall cross section of the main body have a shape selected from the following group: waist-round, rectangle, oval, square, triangle, diamond and polygon.

In order to conveniently identify the position of the unconventional bolt itself and make the assembly more convenient, preferably, the first cross section of the main body has a center line defined by a longest diameter line of the first cross section that is perpendicular to a shortest diameter line of the first cross section, and each end has a marking slot, the marking slot has an opening aligned with the center line. Accordingly, when the unconventional bolt passes through the first through hole and the second through hole and stays in a moving state, the marking slot appears to be in vertical direction (or horizontal direction); when the unconventional bolt is rotated by 90 degrees and stays in a limiting state, the marking slot appears to be in the horizontal direction (or vertical direction). So the state and the rotation position of the unconventional bolt can be judged from the opening direction of the marking slot which can be seen from outside.

Compared with the prior art, in the present invention, firstly, the unconventional bolt not only is with simple structure and easy to assemble and install, but also can effectively improve the rigidity and strength of the nested profiled components after being assembled; secondly, the fastening device using the unconventional bolt has the function of supporting and reinforcing, so as to effectively prevent the nested profiled components from transforming; thirdly, in the nested profiled components, as the edges of the first component closely touch the corresponding edges of the second component which are clamped firmly by the heads of the unconventional bolt and the nut, so that the twin-layers side walls composed of two nested profiled components can come into one single body, therefore, significantly improving the strength and rigidity of the nested profiled components; in addition, the through holes for the unconventional bolt to pass through can be opened anywhere along the height direction of the nested profiled components. Once the unconventional bolt passes through the through holes on the nested profiled components and rotates to be misaligned with the through holes, the fasting device can just fasten the nested profiled components. And the operation is easy and quick, it is convenient to assemble and disassemble, furthermore, the installation of the fastening device can be free from the influence of the dimension and the structure of the profiled components.

DETAILED DESCRIPTION OF THE PREFERRED EMBODIMENT

Figure 1:
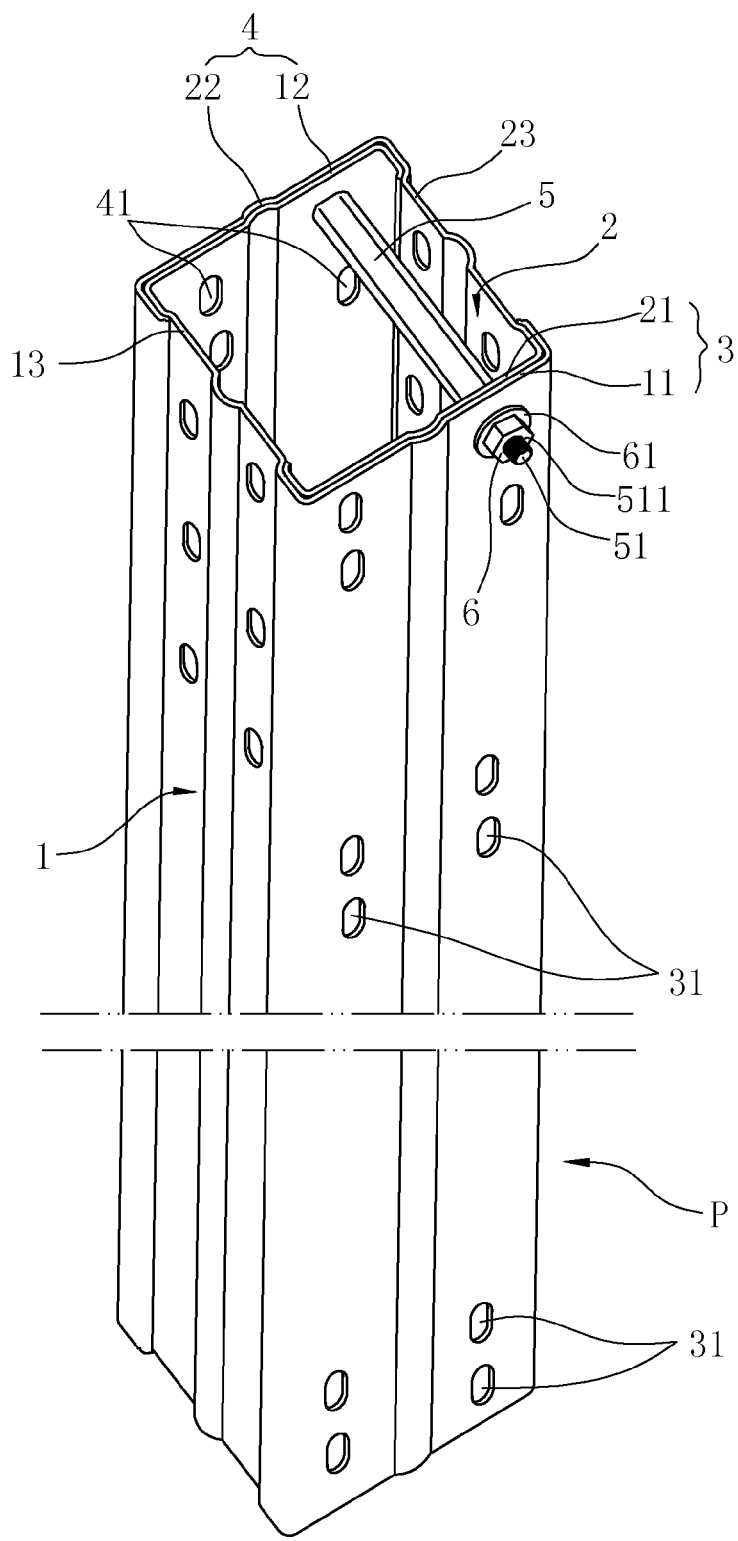
FIG. 1 is a perspective view of a fastening device in accordance with a first embodiment of the present invention when in used.
Figure 2:
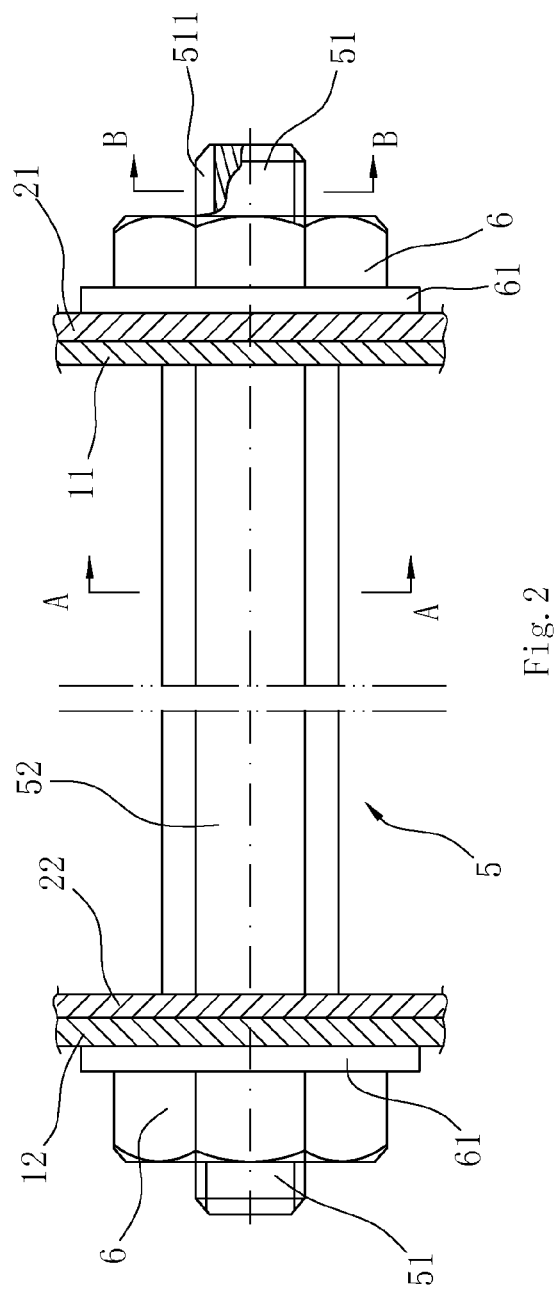
FIG. 2 is a plane view of the fastening device in FIG. 1.
Figure 4:
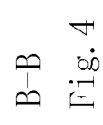
FIG. 4 is a sectional view of section B-B of the fastening device shown in FIG. 2.
Figure 3:
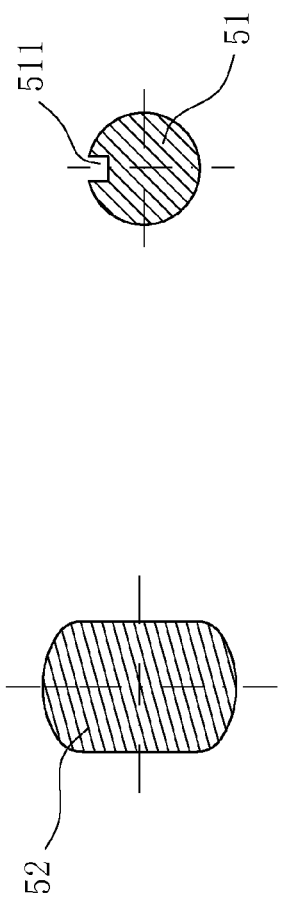
FIG. 3 is a sectional view of section A-A of the fastening device shown in FIG. 2.

To enable a further understanding of the innovative and technological content of the invention herein, refer to the detailed description of the invention and the accompanying drawings below:

FIG. 1~FIG. 4 show a first embodiment of the present invention.

In this embodiment, a fastening device is used in nested profiled components which can be columns and beams of a storage shelf and a frame of a three-dimensional parking garage or the columns and beams for other equipments.

In this embodiment, the nested profiled components P form a hollowed column body with thin-walls, the cross section of the column body is in rectangular. The nested profiled components P include a first component 1 and a second component 2 having the same shape and size overlapped and embraced with each other, the first component 1 and the second component 2 are formed by the cold rolling.

The first component 1 comprises a first edge 11 and a second edge 12 substantially parallel to each other, and a first vertical edge 13 connected with one end of the first edge 11 and one end of the second edge 12; while the second component 2 comprises a third edge 21, a fourth edge 22 substantially parallel to each other, and a second vertical edge 23 connected with the third edge 21 and the forth edge 22. The first edge 11 connects the third edge 21 forming a first twin-layers side wall 3, and the second edge 12 connects the forth edge 22 forming a second twin-layers side wall 4. The fastening device using on the nested profiled components P is to ensure the two edges of the first twin-layers side wall 3 and the second twin-layers side wall 4 closely and firmly to connect with each other.

The fastening device comprises an unconventional bolt 5 and two nuts 6 which are respectively connected at two ends of the unconventional bolt 5. The unconventional bolt 5 comprises a main body 52, the cross section of which are in the shape of waist-round or rectangular, and threaded rods 51 respectively formed at the each end of the main body 52. The first cross section of the main body 52 has a center line defined by a longest diameter line of the first cross section that is perpendicular to a shortest diameter line of the first cross section, and each end has a marking slot 511, the marking slot 511 has an opening aligned with the center line. Each nut 6 which can be either a hex nut or a square nut is screwed on the corresponding threaded rod 51, and a circular flake 61 is provided on the inner surface of each nut 6 to be formed into one single body. The first twin-layers side wall 3 is provided with a first through hole 31, and the second twin-layers side wall 4 is provided with a second through hole 41 aligned with the first through hole 31, the first through hole 31 and the second through hole 41 having a shape and a size adapted to receive the noncircular cross section of the heads 521 of the unconventional bolt 5.

When installing, in consideration of the limited length of the unconventional bolt 5, in order to operate conveniently, swivel nuts adapted to the threaded rods 51, can be respectively sleeved connected to each threaded rod 51 provided on the each end of the unconventional bolt 5. The swivel nuts can pass through the first through hole 31 and the second through hole 41, so that the unconventional bolt 5, under the guidance of the swivel nuts, can enter the nested profiled components horizontally, moreover, the main body 52 of the unconventional bolt 5 is rightly located in between the first twin-layers side wall 3 and the second twin-layers side wall 4, each threaded rod 51 just passes through the first through hole 31 or the second through hole 41 exposed outside of the nested components.

After the unconventional bolt 5 is rotated by 90 degrees, the outer surface in waist-round or rectangular of the main body 52 respectively resists against the inner surface of the first twin-layers side wall 3 and the second twin-layers side wall 4 in misaligned at 90 degrees. At the moment, the swivel nuts can be put down from the threaded rods 51, and the nuts 6 can be screwed on the corresponding threaded rods 51 exposed outside of the nested components. When the nuts 6 are tightened, the first edge 11 and the third edge 21 of the first twin-layers side wall 3 are closely connected with each other between one end of the main body 52 and one flake 61, while the second edge 12 and the fourth edge 22 of the second twin-layers side wall 4 are closely connected with each other between the other end of the main body 52 and the other flake 61 of the nut 6. Therefore, the first twin-layers side wall 3 and the second twin-layers side wall 4, under the actions of the unconventional bolt 5 and the nut 6, are respectively pressed tightly to achieve a seamless connection between two nested components. Additionally, the main body 52 of the unconventional bolt 5 located in the hollowed column body plays a role of an effective support, and can prevent the nested components from transforming, so as to improve the strength and rigidity of the nested components to the greatest extent.

In this embodiment, the through hole can be opened anywhere along the height direction of the first twin-layers side wall 3 and the second twin-layers side wall 4, which can not only achieve the fastening of the two ends of the nested profiled components, but also clamp the twin-layers side walls at the middle position or other positions of the nested components. The fastening device is equipped with a convenient operation, an easy disassembly and an effective improvement of the installation efficiency.

Figure 5:
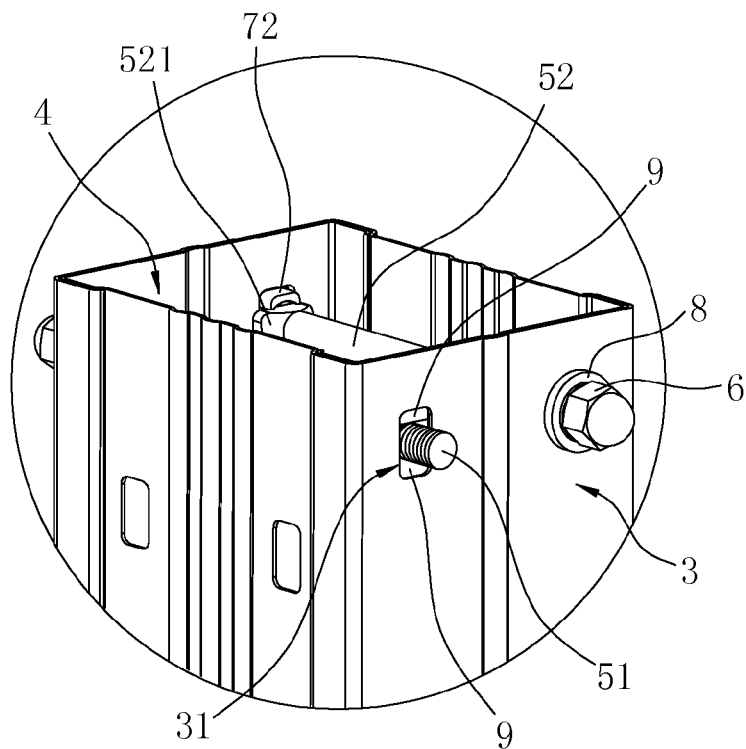
FIG. 5 is a perspective view of the fastening device in accordance with a second embodiment of the present invention when in used.
Figure 6:
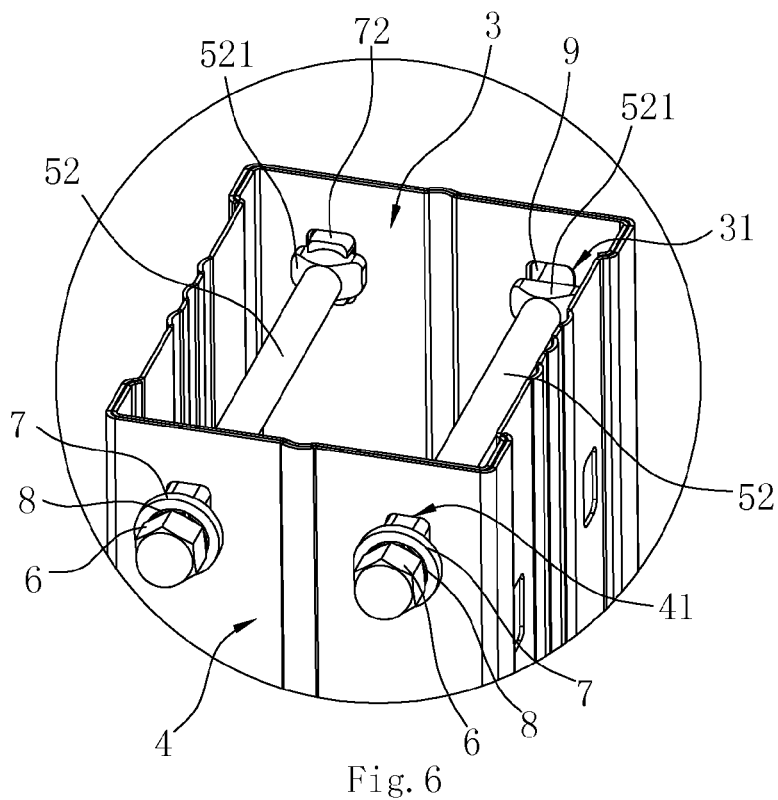
FIG. 6 is another perspective view of the fastening device in accordance with the second embodiment of the present invention.
Figure 7:
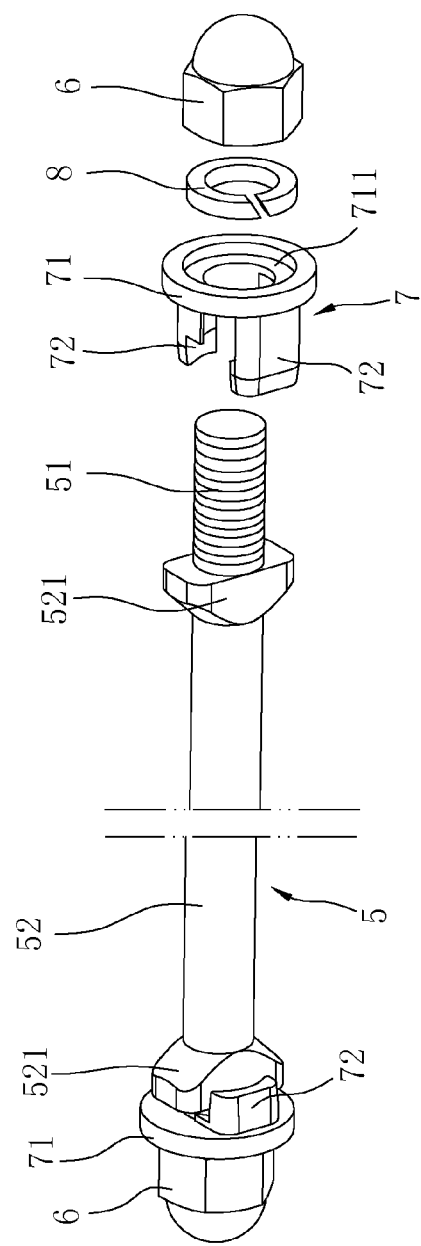
FIG. 7 is an exploded perspective view of the fastening device in accordance with the second embodiment of the present invention.
Figure 8:
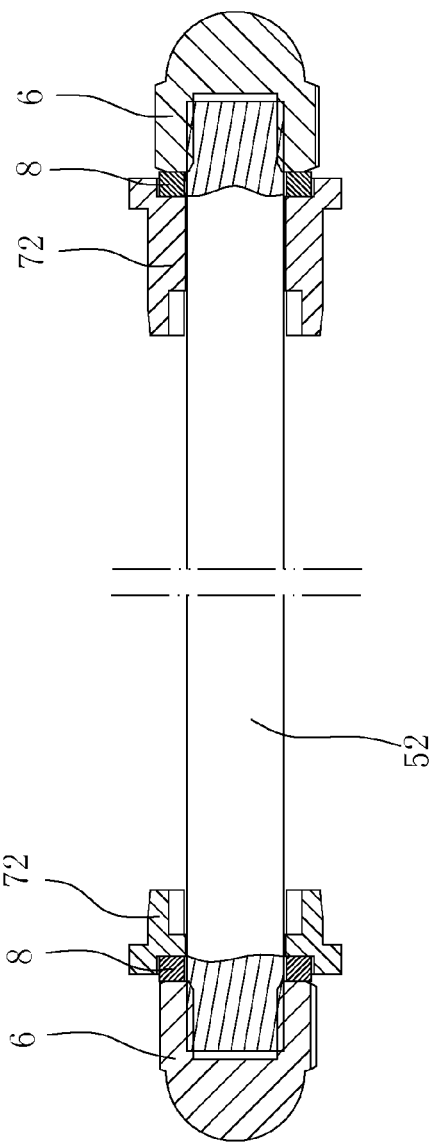
FIG. 8 is a sectional view of the fastening device in accordance with the second embodiment of the present invention.

FIG. 5~FIG. 8 show a second embodiment of the present invention.

In the second embodiment, the fastening device is also installed on the nested profiled components similarly with the first embodiment. The structure of the nested profiled components is the same with that in the first embodiment; therefore no more tautology is provided here.

The difference between the second embodiment and the first embodiment lies in: The unconventional bolt 5 further includes two heads 521 formed at the ends of the main body 52, the cross section of each head 521 in the shape of waist-round or rectangular, and the cross section of the main body 52 is in circular. And the fastening device further comprises two stop sleeves 7 each of which includes a ring head 71 adapt to the threaded rods 51, and a plug pin 72 extending along the length of the unconventional bolt 5.

When installing, the unconventional bolt 5 passes through the first through hold and the second through hole, the main body 52 of the unconventional bolt 5 is rightly located in between the first twin-layers side wall 3 and the second twin-layers side wall 4, each threaded rod 51 just passes through the first through hole 31 or the second through hole 41 exposed outside of the nested components.

After the unconventional bolt 5 is rotated 90 degrees, the outer surface in waist-round or rectangular of the heads 521 respectively resists against the inner surface of the first twin-layers side wall 3 and the second twin-layers side wall 4, the heads 521 are misaligned in 90 degrees relatively to the first through hole 31 or the second through hole 41. In such a way, a gap 9 is formed between the misaligned head 521 and the inner surface of the corresponding through hole. When the ring head 71 of the stop sleeve 7 is sleeved on the corresponding threaded rod 51, the plug spin 72 of the stop sleeve 7 is rightly inserted into the gap 9. As a result, the unconventional bolt 5 is unable to rotate. At the moment, the nuts 6 can be screwed on the corresponding threaded rods 51 exposed outside of the nested components, tightening each nut 6 until the nut 6 closely rests against the external surface of the stop sleeve 7. An anti-slip gasket 8 is also provided between each nut 6 and each stop sleeve 7, which has a ring-shaped slot 711 on the external surface. The gasket 8 is just inserted in the ring-shaped slot 711. Therefore, the first twin-layers side wall 3 and the second twin-layers side wall 4, under the actions of the unconventional bolt 5, the stop sleeves 7 and the nuts 6, are respectively pressed tightly and achieve a seamless connection between two nested components.

The invention claimed is:

1. A fastening device using an unconventional bolt, to connect two nested profiled components that include a first component and a second component, the first component and the second component having same shape and size and forming a hollowed column body, the first component comprises a first edge and a second edge substantially parallel to each other;

the second component comprises a third edge and a forth edge substantially parallel to each other;

the first edge connecting to the third edge forming a first twin-layers side wall, and the second edge connecting the forth edge forming a second twin-layers side wall;

wherein the unconventional bolt comprises a main body with a first cross section and two ends, each end comprises a head coaxially connected to the main body, and a threaded rod coaxially connected to the head, the head has a noncircular cross section, and the first cross section of the main body is contained within the noncircular cross section of the head, and two nuts for connecting to the two ends of the unconventional bolt, the first twin-layers side wall is provided with a first through hole, and the second twin-layers side wall is provided with a second through hole aligned with the first through hole, the first through hole and the second through hole having a shape and a size adapted to receive the noncircular cross section of the heads of the unconventional bolt;

each head of the unconventional bolt rests against an inner surface of a twin-layers side wall after being inserted through the through holes and rotated to be misaligned with the through holes;

two nuts are respectively screwed on two threaded rods of the unconventional bolt that extend to outside of the twin-layers side walls of the column body.

2. The unconventional bolt of claim 1, wherein the first cross section of the main body is substantially identical to the noncircular cross section of the head, and the first cross section of the main body has a shape selected from the following group: waist-round, rectangle, oval, square, triangle, diamond, trapezoid, and polygon with four or more edges.

3. The fastening device of claim 1, wherein the fastening device further comprises two stop sleeves, each of stop sleeves includes a ring head adapted to receive the threaded rod and a plug pin extending vertically away from the ring head;

each plug pin is inserted into a gap between the head and the through hole, and each threaded rod runs through a ring head, each nut rests against a stop sleeve after being screwed onto the threaded rod.

4. The fastening device of claim 3, wherein an anti-slip gasket is provided between each nut and each stop sleeve.

5. The fastening device of claim 1, wherein the first cross section of the main body is substantially identical to the noncircular cross section of the heads, and the cross section of the main body has a shape selected from the following group: waist-round, rectangle, oval, square, triangle, diamond, trapezoid, and polygon with four or more edges.

* * * * *